United States Patent
Yang et al.

(10) Patent No.: US 11,778,442 B2
(45) Date of Patent: Oct. 3, 2023

(54) SCREEN PROJECTION METHOD, RECEIVING END DEVICE, AND SENDING END DEVICE

(71) Applicant: HANGZHOU HIKVISION DIGITAL TECHNOLOGY CO., LTD., Hangzhou (CN)

(72) Inventors: Pengfei Yang, Hangzhou (CN); Kefeng Yan, Hangzhou (CN); Wanjiaman Li, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/904,739

(22) PCT Filed: Feb. 22, 2021

(86) PCT No.: PCT/CN2021/077209
§ 371 (c)(1),
(2) Date: Aug. 22, 2022

(87) PCT Pub. No.: WO2021/169907
PCT Pub. Date: Sep. 2, 2021

(65) Prior Publication Data
US 2023/0083485 A1    Mar. 16, 2023

(30) Foreign Application Priority Data
Feb. 26, 2020    (CN) .......................... 202010120292.8

(51) Int. Cl.
    *H04W 48/16*     (2009.01)
    *H04W 4/80*     (2018.01)
    *H04W 8/00*     (2009.01)

(52) U.S. Cl.
    CPC ............. *H04W 4/80* (2018.02); *H04W 8/005* (2013.01)

(58) Field of Classification Search
    CPC .................................................. G09G 2370/16
    See application file for complete search history.

(56) References Cited

U.S. PATENT DOCUMENTS 9,996,367 B1 *   6/2018   Bao ........................... G06F 3/14
2011/0173256 A1 *   7/2011   Khalatian ............... H04L 67/54
                                                  709/203
(Continued)

FOREIGN PATENT DOCUMENTS

CN     106534547     3/2017
CN     107079383     8/2017
(Continued)

OTHER PUBLICATIONS

Girotto et al., "The National Cinema Museum of Torino: A comprehensive digital strategy," IEEE Xplore 2015, 4 pages.
(Continued)

*Primary Examiner* — Cindy Trandai
(74) *Attorney, Agent, or Firm* — NORTON ROSE FULBRIGHT US LLP

(57) ABSTRACT

The present application provides a screen projection method, a receiving end device, and a sending end device. The receiving end device performs active wireless scanning and searching on the sending end device, and when the sending end device is scanned, establishes a wireless connection with the sending end device; and once the wireless connection is established, the receiving end device automatically sends a screen projection code to the connected sending end device, and the sending end device may prompt a user to perform a screen projection operation by means of displaying the screen projection code. In this process, there is no need for the user to perform complicated manual (Continued)

operations, the sending end device can automatically acquire the screen projection code, and prompts the user to perform the screen projection operation in a timely manner, thereby improving the timeliness of the screen projection operation.

11 Claims, 4 Drawing Sheets

(56) References Cited

U.S. PATENT DOCUMENTS

| | | | | |
|---|---|---|---|---|
| 2013/0159874 | A1* | 6/2013 | Bhogal | G06F 3/0484 715/733 |
| 2013/0268624 | A1 | 10/2013 | Yagiura | |
| 2015/0170212 | A1 | 6/2015 | McGie | |
| 2015/0373066 | A1* | 12/2015 | Miao | G06F 3/1454 715/753 |
| 2017/0250830 | A1* | 8/2017 | Chang | H04L 12/1403 |
| 2017/0324573 | A1* | 11/2017 | Peng | H04M 3/567 |
| 2018/0183840 | A1 | 6/2018 | Lee | |
| 2018/0196596 | A1 | 7/2018 | Choi et al. | |
| 2018/0309753 | A1* | 10/2018 | Xiong | H04W 12/04 |
| 2019/0362314 | A1 | 11/2019 | Chen | |
| 2020/0314649 | A1* | 10/2020 | Yen | G10L 25/51 |
| 2021/0034318 | A1* | 2/2021 | Goodman | G06F 3/04815 |
| 2021/0274243 | A1* | 9/2021 | Zhao | H04N 21/43076 |

FOREIGN PATENT DOCUMENTS

| | | |
|---|---|---|
| CN | 108428027 | 8/2018 |
| CN | 108901024 | 11/2018 |
| CN | 108920116 | 11/2018 |
| CN | 108920937 | 11/2018 |
| CN | 109525990 | 3/2019 |
| CN | 109862404 | 6/2019 |
| CN | 209017200 | 6/2019 |
| CN | 110515573 | 11/2019 |
| CN | 110740288 | 1/2020 |

OTHER PUBLICATIONS

International Search Report and Written Opinion issued in Corresponding PCT Application No. PCT/CN2021/077209, dated Apr. 30, 2021 (English Translation provided).

Long et al., "Development of Multi-screen Interactive Control System and Its Equipment" Guangzhou Guojiangli Electronics Co., Ltd., 4 pages (no translation available).

Extended European Search Report issued in corresponding European Application No. 217613850, dated Jul. 21, 2023.

* cited by examiner

SCREEN PROJECTION METHOD, RECEIVING END DEVICE, AND SENDING END DEVICE

CROSS-REFERENCE TO RELATED APPLICATIONS

The present application is a national phase under 35 U.S.C. § 371 of International Application No. PCT/CN2021/077209, filed Feb. 22, 2021, which claims priority to Chinese patent application No. 202010120292.8 filed with the China National Intellectual Property Administration on Feb. 26, 2020 and entitled "SCREEN PROJECTION METHOD, RECEIVING END DEVICE, AND SENDING END DEVICE", each of which are incorporated herein by reference in their entirety.

TECHNICAL FIELD

The present application relates to the technical field of the Internet, and in particular, to a screen projection method, a receiving end device and a sending end device.

BACKGROUND

With the development of Internet technology, screen projection technology has been widely used. Screen projection refers to projecting media files in a sending end device onto a receiving end device for display. Screen projection is also called multi-screen interaction. For example, a video in a mobile phone can be played on a smart TV, so that users can browse the video in the mobile phone on the smart TV.

In the current screen projection method, a receiving end device is configured with a screen projection code. After learning a screen projection code of the receiving end device, the user enters the screen projection code on the sending end device and selects to start screen projection. At this time, the sending end device will send local media file to the receiving end device, and the receiving end device will play and display the media file.

In practical applications, the screen projection code of the receiving end device has a certain period of validity. When the period of validity expires, the screen projection code will be invalid, and it is necessary to refresh the screen projection code. The user can learn the refreshed screen projection code again, and then enter the screen projection code and select to start the screen projection. It can be seen that the above screen projection method requires complicated manual operation, which leads to poor timeliness of screen projection operation.

SUMMARY

The embodiments of the present application aim to provide a screen projection method, a receiving end device and a sending end device, so as to improve the timeliness of screen projection operation. Specifically, the technical solutions are as follows.

In a first aspect, an embodiment of the present application provides a screen projection method, which is applied to a receiving end device, including:
searching for a sending end device by using a preset wireless scanning technology;
establishing a wireless connection with the sending end device when the sending end device is found;
acquiring a screen projection code, and sending the screen projection code to the connected sending end device, so that the connected sending end device displays the screen projection code to prompt a screen projection operation.

Optionally, the searching for a sending end device by using a preset wireless scanning technology, includes:
enabling a Bluetooth service, and periodically searching for the sending end device by using a Bluetooth scanning technology.

Optionally, the establishing a wireless connection with the sending end device when the sending end device is found, includes:
sending a request packet to the sending end device when the sending end device is found;
receiving a response packet fed back by the sending end device, wherein the response packet carries identification information indicating whether the sending end device has opened a screen projection software;
establishing the wireless connection with the sending end device when it is determined that the sending end device has opened the screen projection software based on the identification information.

Optionally, after establishing the wireless connection with the sending end device when the sending end device is found, the method further includes:
detecting whether the current screen projection code changes;
wherein the acquiring a projection code includes:
when the current screen projection code changes, acquiring the changed current screen projection code.

Optionally, after detecting whether the current projection code changes, the method further includes:
when the current screen projection code does not change, returning to the searching for a sending end device by using a preset wireless scanning technology.

In a second aspect, an embodiment of the present application provides a screen projection method, which is applied to a sending end device, and the method includes:
searching for a receiving end device by using a preset wireless scanning technology;
establishing a wireless connection with the receiving end device when the receiving end device is found; and
receiving and displaying a screen projection code sent by the receiving end device to prompt a screen projection operation.

Optionally, the searching for a receiving end device by using a preset wireless scanning technology includes:
enabling a Bluetooth service, and periodically searching for the receiving end device by using a Bluetooth scanning technology.

Optionally, the sending end device has opened a screen projection software;
wherein the receiving and displaying a screen projection code sent by the receiving end device to prompt a screen projection operation includes:
receiving the screen projection code sent by the receiving end device;
displaying a main interface of the screen projection software, and displaying the screen projection code on the main interface to prompt the screen projection operation.

In a third aspect, an embodiment of the present application provides a receiving end device including a wireless module and a transmission module;
the wireless module is configured for searching for a sending end device by using a preset wireless scanning technology, and establishing a wireless connection with the sending end device when the sending end device is found,
the transmission module is configured for acquiring a screen projection code, and sending the screen projection code to the connected sending end device, so that the connected sending end device displays the screen projection code to prompt a screen projection operation.

Optionally, the wireless module is specifically configured for:

enabling a Bluetooth service, and periodically searching for the sending end device by using a Bluetooth scanning technology.

Optionally, the wireless module is specifically configured for:

sending a request packet to the sending end device when the sending end device is found;

receiving a response packet fed back by the sending end device, wherein the response packet carries identification information indicating whether the sending end device has opened a screen projection software;

establishing the wireless connection with the sending end device when it is determined that the sending end device has opened the screen projection software based on the identification information.

Optionally, the receiving end device further includes:

a detection module, configured for detecting whether the current screen projection code changes;

the transmission module is specifically configured for:

when the current screen projection code changes, acquiring the changed current screen projection code.

Optionally, the wireless module is specifically configured for:

when the current screen projection code does not change, searching for the sending end device by using the preset wireless scanning technology.

In a fourth aspect, an embodiment of the application provides a sending end device including a wireless module and a display screen;

the wireless module is configured for searching for a receiving end device by using a preset wireless scanning technology; and establishing a wireless connection with the receiving end device when the receiving end device is found;

the display screen is configured for receiving and displaying a screen projection code sent by the receiving end device to prompt a screen projection operation.

Optionally, the wireless module is specifically configured for:

enabling a Bluetooth service, and periodically searching for the receiving end device by using a Bluetooth scanning technology.

Optionally, the sending end device has opened a screen projection software;

the display screen is specifically configured for:

receiving the screen projection code sent by the receiving end device;

displaying a main interface of the screen projection software, and displaying the screen projection code on the main interface to prompt the screen projection operation.

Embodiments of the present application provide a screen projection method, a receiving end device and a sending end device. The receiving end device searches for a sending end device by using a preset wireless scanning technology, establishes a wireless connection with the sending end device when the sending end device is found, and the receiving end device acquires a screen projection code and sends the screen projection code to the connected sending end device. After receiving the screen projection code, the connected sending end device displays the screen projection code to prompt a screen projection operation. The receiving end device actively scans and searches for a sending end device wirelessly, and when the sending end device is found, establishes a wireless connection with the sending end device; and once the wireless connection is established, the receiving end device automatically sends a screen projection code to the connected sending end device, and the sending end device may prompt a user to perform a screen projection operation by means of displaying the screen projection code. In this process, there is no need for the user to perform complicated manual operations, the sending end device can automatically acquire the screen projection code and prompt the user to perform the screen projection operation in time, thus improving the timeliness of the screen projection operation.

BRIEF DESCRIPTION OF DRAWINGS

In order to more clearly describe the technical solutions of the embodiments of the present application or of the prior art, drawings that need to be used in embodiments and the prior art will be briefly described below. Obviously, the drawings provided below are for only some embodiments of the present application; those skilled in the art may also obtain other drawings based on these drawings.

DETAILED DESCRIPTION

In order to make the objectives, technical solutions, and advantages of the present application clearer and more understandable, the present application will be described in more detail below with reference to the appended drawings and embodiments. Obviously, the described embodiments are only some, and not all, of the embodiments of the present application. All other embodiments obtained based on the embodiments of the present application by those skilled in the art fall into the scope of protection defined by the present application.

In order to improve the timeliness of screen projection operation, the embodiments of the present application provide a screen projection method, a receiving end device and a sending end device. The following first introduces the screen projection method provided by an embodiment of the present application.

The execution subject of a screen projection method provided by an embodiment of the present application may be a screen projection system, which includes a receiving end device (such as a smart TV, a projector, a conference tablet, etc.) for displaying media files and a sending end device (such as a mobile phone, a personal computer, etc.) for requesting screen projection. Firstly, screen projection methods respectively applied to the receiving end device and the sending end device are introduced.

Figure 1:
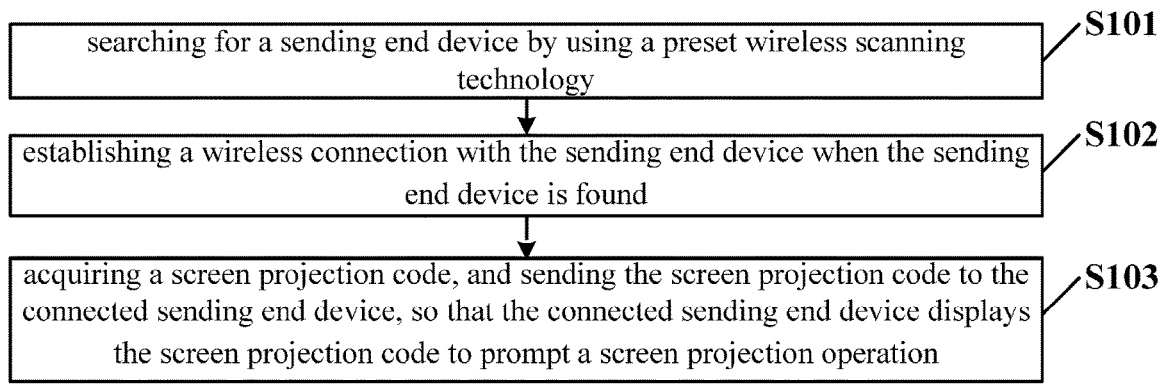
FIG. 1 is a flowchart of a screen projection method applied to a receiving end device according to an embodiment of the present application.

As shown in FIG. 1, a screen projection method applied to a receiving end device provided by an embodiment of the present application may include the following steps.

S101, searching for a sending end device by using a preset wireless scanning technology.

S102, establishing a wireless connection with the sending end device when the sending end device is found;

S103, acquiring a screen projection code, and sending the screen projection code to the connected sending end device, so that the connected sending end device displays the screen projection code to prompt a screen projection operation.

According to the embodiment of the present application, the receiving end device actively scans and searches for a sending end device wirelessly, and when the sending end device is found, it establishes a wireless connection with the sending end device; and once the wireless connection is established, the receiving end device automatically sends a screen projection code to the connected sending end device, and the sending end device may prompt a user to perform a screen projection operation by means of displaying the screen projection code. In this process, there is no need for the user to perform complicated manual operations, the sending end device can automatically acquire the screen projection code and prompt the user to perform the screen projection operation in time, thus improving the timeliness of the screen projection operation.

Wireless scanning technology is a wireless technology for searching devices, including WiFi (Wireless Fidelity) scanning technology, Bluetooth scanning technology, etc. The wireless scanning technology adopted by the receiving end device generally depends on what kind of wireless module is installed on the receiving end device. If the receiving end device is installed with a WiFi module, the WiFi scanning technology may be used to search for the sending end device, and once a sending end device enters a scanning range and its WiFi function is enabled, the receiving end device may scan the sending end device. If the receiving end device is installed with a Bluetooth module, the Bluetooth scanning technology may be used to search for the sending end device, and once a sending end device enters a scanning range and its Bluetooth function is enabled, the receiving end device may scan the sending end device. In one implementation, if the receiving end device is installed with both WiFi module and Bluetooth module, the Bluetooth function will be enabled first, and the Bluetooth scanning technology is used to search for the sending end device.

Optionally, S101 may specifically include: enabling a Bluetooth service, and periodically searching for a sending end device by using a Bluetooth scanning technology.

In an implementation manner of the embodiment of the present application, if the receiving end device is provided with a Bluetooth module, the receiving end device can use the Bluetooth scanning technology to search for a device by enabling the Bluetooth service of the Bluetooth module, and in order to effectively utilize the device resources, the searching may be performed periodically. The embodiment of the present application adopts the classic Bluetooth technology, which is a global standard open for wireless data and voice communication, and is a special short-range wireless technology connection based on low-cost short-range wireless connection to establish a communication environment for fixed and mobile devices.

When the receiving end device finds a sending end device, it means that the sending end device enables the same wireless function as that of the receiving end device, and the distance from the receiving end device is within a certain range, and the receiving end device may actively establish a wireless connection with the sending end device. The specific way of establishing wireless connection may be as follows: the receiving end device sends a request packet to the scanned sending end device, and the request packet carries verification information; after receiving the request packet, the sending end device verifies the verification information, if the verification is passed, it will feed back a response packet allowing connection to the receiving end device; after receiving the response packet, the receiving end device may establish a wireless connection with the sending end device. Screen projection software is installed on the sending end device. Specifically, the screen projection software on the sending end device interacts with the receiving end device to realize wireless connection between the sending end device and the receiving end device.

In an implementation of the embodiment of the present application, the wireless function of the sending end device may be controlled by the screen projection software, that is to say, a sending end device may only be controlled to enable the wireless function by the screen projection software only when the screen projection software is opened. In this way, the sending end device scanned by the receiving end device must have already opened the screen projection software, and the receiving end device can establish a connection with the sending end device directly when the sending end device is found. In another implementation of the embodiment of the present application, the screen projection software installed on the sending end device may also be integrated with a wireless pairing strategy.

Optionally, S102 may specifically include: sending a request packet to the sending end device when the sending end device is found; receiving a response packet fed back by the sending end device, wherein the response packet carries identification information indicating whether the sending end device has opened a screen projection software; establishing a wireless connection with the sending end device when it is determined that the sending end device has opened the screen projection software based on the identification information.

In an implementation manner of the embodiment of the present application, when the receiving end device searches for a sending end device, it will send a request packet to the sending end device for requesting to establish a wireless connection with the sending end device. After the sending end device performs the above-mentioned verification operation, the screen projection software identifies the status that whether the current screen projection software is opened in the request packet, and it identifies whether the screen projection software has been opened; and when the sending end device feeds back the response packet to the receiving end device, the packet carries the identification information indicating whether the screen projection software has been opened. For example, a designated bit in the response packet may be preset as 1, which means that the sending end device has opened the screen projection software, and if the designated bit ID is 0, it means that the sending end device has not opened the screen projection software. Specifically, the designated bit may be any reserved bit in the response packet based on a specific transmission protocol, and the designated bit identification may be specifically set by a program running in a memory. According to the identification information, the receiving end device may determine whether the sending end device has opened the screen projection software, and establish wireless connection with the sending end device when it is determined that the screen projection software has been opened. If the sending end device does not open the screen projection software, it will not establish a wireless connection with the sending end device, that is, it will not trigger the screen projection operation. In one implementation, if the sending end device does not install the screen projection software, it will not respond to the request packet sent by the receiving end device. After the receiving end device sends the request packet to the sending end device, if it has not received a response packet within a period of time, it may be determined that the sending end device has not installed the screen projection software and will not establish a wireless connection with the sending end device, that is, the screen projection operation will not be triggered.

After the wireless connection between the receiving end device and the sending end device is established, the receiving end device automatically acquires the screen projection code. The screen projection code may be randomly generated locally by the receiving end device or pre-configured by the user on the receiving end device. The receiving end device sends the acquired screen projection code to the connected sending end device. After receiving the screen projection code, the sending end device may display the screen projection code on a local display interface to prompt the user that the screen projection code has been learned and that the user may select to start the screen projection operation. The user may click and select on the interface to trigger the screen projection operation. Of course, the receiving end device may also display the acquired screen projection code on the local display interface, and the user may determine whether the screen projection codes obtained by the receiving end device and the sending end device are the same by viewing the display contents of the two devices, so as to verify whether the communication between the two devices is abnormal. If the screen projection codes displayed by the two devices are different, the communication between the two devices is abnormal.

Figure 2:
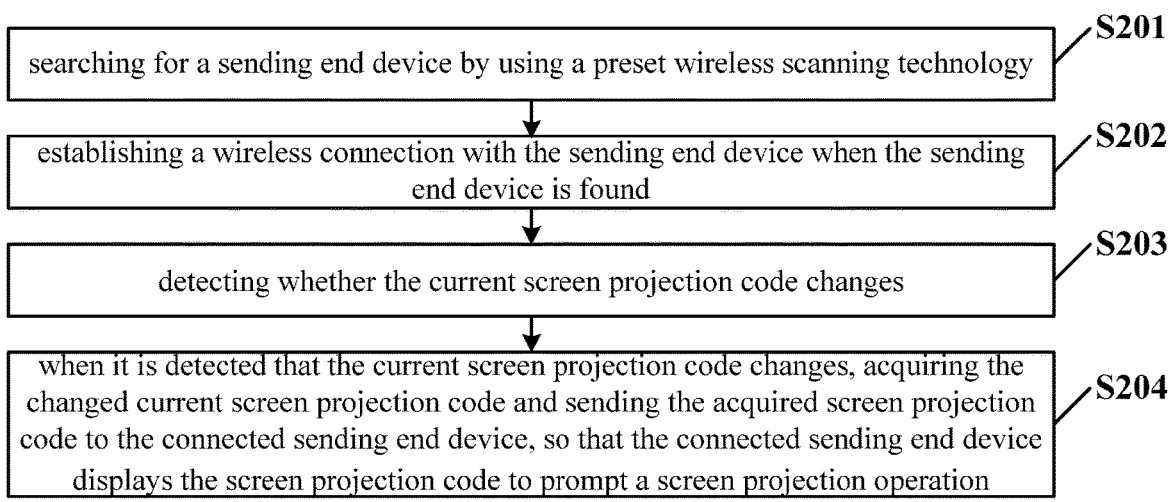
FIG. 2 is a flowchart of a screen projection method applied to a receiving end device according to another embodiment of the present application.

According to the embodiment shown in FIG. 1, an embodiment of the present application provides another screen projection method applied to the receiving end device, as shown in FIG. 2, which may include the following steps.

S201, searching for a sending end device by using a preset wireless scanning technology.

S202, establishing a wireless connection with the sending end device when the sending end device is found;

S203, detecting whether the current screen projection code changes.

S204, when it is detected that the current screen projection code changes, acquiring the changed current screen projection code and sending the acquired screen projection code to the connected sending end device, so that the connected sending end device displays the screen projection code to prompt a screen projection operation.

After one screen projection code expires, the receiving end device will update the screen projection code. In order to cope with the change of the screen projection code, the receiving end device may regularly detect whether the screen projection code changes after establishing a wireless connection with the sending end device. The receiving end device acquires the locally recorded screen projection code at certain intervals. If the current screen projection code acquired in a certain period is different from that acquired in the previous period, it means that the current screen projection code has changed. Once it is detected the current screen projection code changes, the changed current screen projection code will be acquired, and then the acquired screen projection code will be sent to the connected sending end device, which ensures that the sending end device may learn the changed screen projection code in real time and reliably, and further ensures the timeliness of the screen projection operation.

Optionally, after S203, the method provided by the embodiment of the present application may also include: if the current screen projection code does not change, return to S201.

If the current screen projection code does not change all the time, that is, the current screen projection codes acquired in several consecutive periods are the same, because the sending end device has already learned the screen projection code, the receiving end device will not repeatedly send the screen projection code to the sending end device, but will circularly execute the above screen projection method until the screen projection code changes, and then send the changed screen projection code to the sending end device.

For ease of understanding, the following describes the screen projection method applied to the receiving end device provided by an embodiment of the present application with reference to specific examples.

Figure 3:
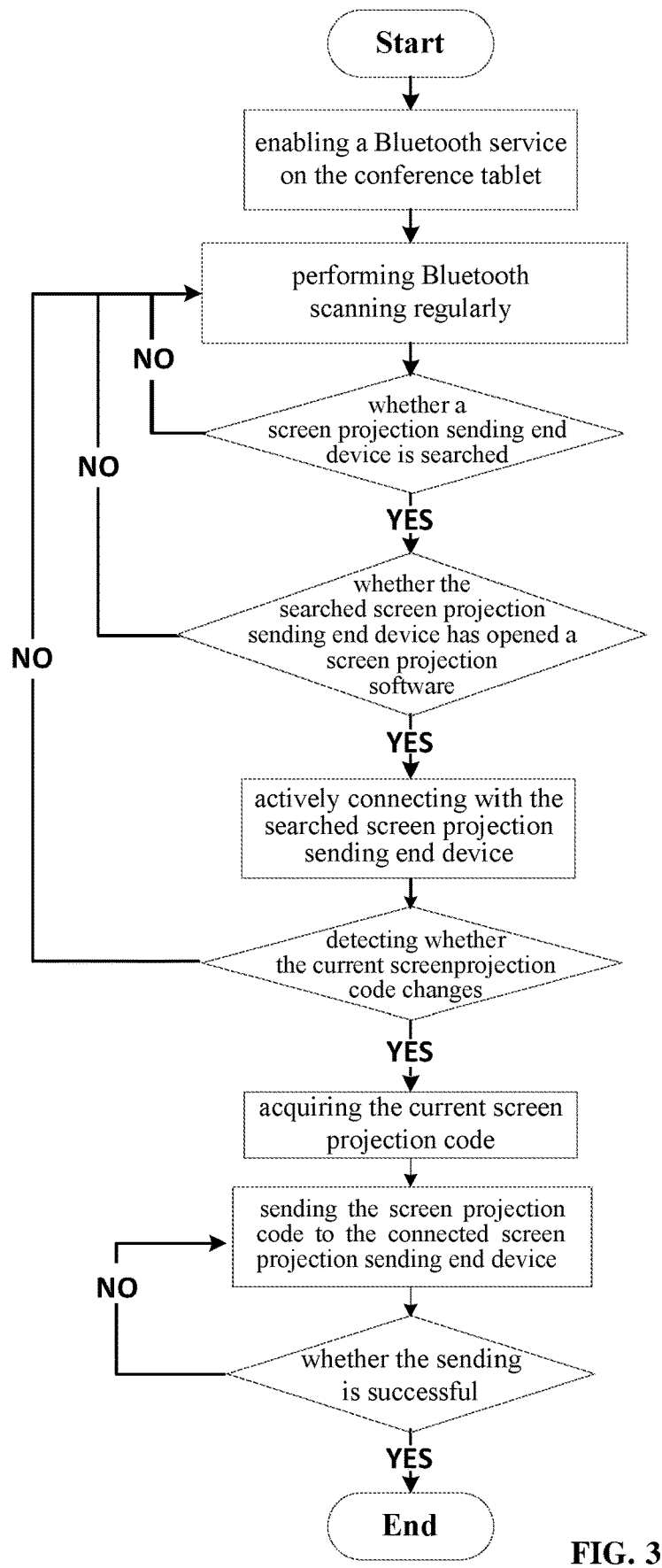
FIG. 3 is a flowchart of a screen projection method applied to a conference tablet according to an embodiment of the present application

Taking the receiving end device as a conference tablet as an example, the conference tablet is a large-screen interactive display device applied to conferences, education and other scenarios. As shown in FIG. 3, the screen projection method applied to the conference tablet may include the following steps.

Step 1, enabling a Bluetooth service on the conference tablet.

The conference tablet is provided with a Bluetooth module. Before screen projection, the Bluetooth function of the Bluetooth module in the conference tablet should be enabled first.

Step 2, performing Bluetooth scanning regularly.

After the Bluetooth is enabled, an operating system of the conference tablet will return a message indicating that the Bluetooth is enabled successfully, and after confirming that the Bluetooth is enabled successfully, it will automatically start a scheduled Bluetooth scanning to search for personal computers, mobile phones and other sending end devices for screen projection in a conference room.

Step 3, determining whether a screen projection sending end device is searched, if yes, execute Step 4, otherwise, return to Step 2.

Step 4, determining whether the searched screen projection sending end device has opened a screen projection software, if yes, execute step 5, otherwise, return to Step 2.

Specifically, the conference tablet sends a request packet to the sending end device, and the sending end device feeds back a response packet carrying identification information indicating whether the sending end device has opened a screen projection software, and then the conference tablet determines whether the searched sending end device has opened the screen projection software according to the identification information in the received response packet.

Step 5, actively connecting with the searched screen projection sending end device.

The user enters the conference room with a screen projection sending end device that has opened the screen projection software, and the projection sending end device enables the Bluetooth function, and is within the Bluetooth search range of the conference tablet; in the response packet received by the conference tablet, the identification information indicates that the sending end device has opened the screen projection software, and then the conference tablet directly establishes Bluetooth connection with the screen projection sending end device.

Step 6, detecting whether the current screen projection code changes, if yes, execute Step 7, otherwise, return to execute Step 2.

Step 7, acquiring the current screen projection code.

Step 8, sending the screen projection code to the connected screen projection sending end device.

Step 9, determining whether the sending is successful, if not, return to Step 8.

After the conference tablet establishes a Bluetooth connection with the screen projection sending end device, the conference tablet actively sends the changed screen projection code to the screen projection sending end device. After receiving the screen projection code, the screen projection sending end device will display the received screen projection code in the screen projection software to prompt the user to start the screen projection. If the conference tablet is connected to the screen projection sending end device for the first time, and the conference tablet sends the screen projection code to the screen projection sending end device for the first time, the conference tablet may directly send the screen projection code to the connected screen projection sending end device without determining whether the screen projection code is changed.

Figure 4:
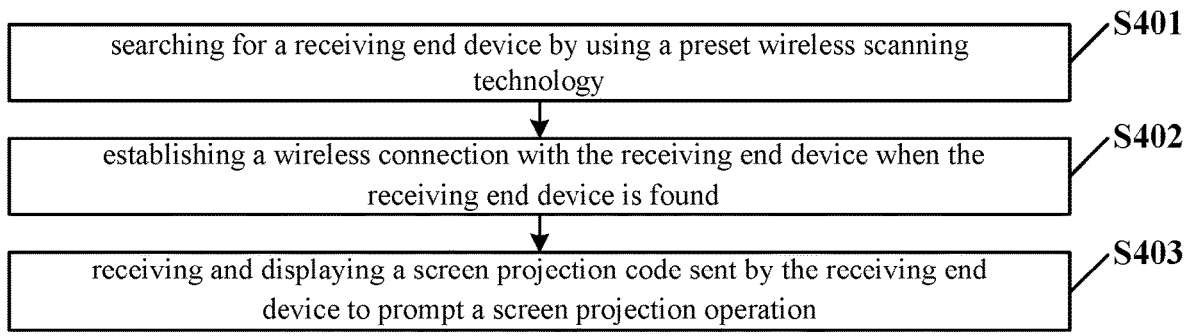
FIG. 4 is a flowchart of a screen projection method applied to a sending end device according to an embodiment of the present application.

An embodiment of the present application also provides a screen projection method applied to a sending end device, as shown in FIG. 4, which may include the following steps.

S401, searching for a receiving end device by using a preset wireless scanning technology;

S402, establishing a wireless connection with the receiving end device when the receiving end device is found;

S403, receiving and displaying a screen projection code sent by the receiving end device to prompt a screen projection operation.

According to the embodiment of the present application, the sending end device actively scans and searches for a receiving end device, and when the receiving end device is found, it establishes a wireless connection with the receiving end device; and after the wireless connection is established, the sending end device will receive the screen projection code sent by the receiving end device, display the received screen projection code, and prompt the user to perform the screen projection operation by displaying the screen projection code. In this process, there is no need for the user to perform complicated manual operations, the sending end device can automatically acquire the screen projection code and prompt the user to perform the screen projection operation in time, thus improving the timeliness of the screen projection operation.

Optionally, S401 may be specifically configured for: enabling a Bluetooth service, and periodically searching for a receiving end device by using a Bluetooth scanning technology.

In an implementation manner of the embodiment of the present application, if the sending end device is provided with a Bluetooth module, the sending end device may search for a device through a Bluetooth scanning technology by enabling the Bluetooth service of the Bluetooth module, and in order to effectively utilize the device resources, the searching operation may be performed periodically.

When the sending end device finds the receiving end device, it means that the receiving end device has enabled the same wireless function as that of the sending end device, and the distance from the sending end device is within a certain range, and the sending end device may actively establish a wireless connection with the receiving end device. The specific process of establishing a wireless connection may be realized by the interaction between the screen projection software installed on the sending end device and the receiving end device.

After the wireless connection between the sending end device and the receiving end device is established, the receiving end device will send the screen projection code to the sending end device. After receiving the screen projection code, the sending end device may display the screen projection code on a local display interface to prompt the user that the screen projection code has been learned and that the user may select to start the screen projection operation. The user may click and select on the interface to trigger the screen projection operation.

Optionally, the sending end device has opened the screen projection software. Correspondingly, S403 may specifically include: receiving the screen projection code sent by the receiving end device; displaying a main interface of the screen projection software, and displaying the screen projection code on the main interface to prompt the screen projection operation.

After receiving the screen projection code sent by the receiving end device, the sending end device may pop up the main interface of the screen projection software, the main interface displays the screen projection code, and the user may see the screen projection code on the main interface of the screen projection software. After sees the screen projection code, the user may determine that the connection between the sending end device and the receiving end device has been established. At this time, the user may click and select on the interface to trigger the screen projection operation.

For ease of understanding, the following describes the screen projection method applied to the sending end device provided by the embodiment of the present application with reference to specific examples.

Figure 5:
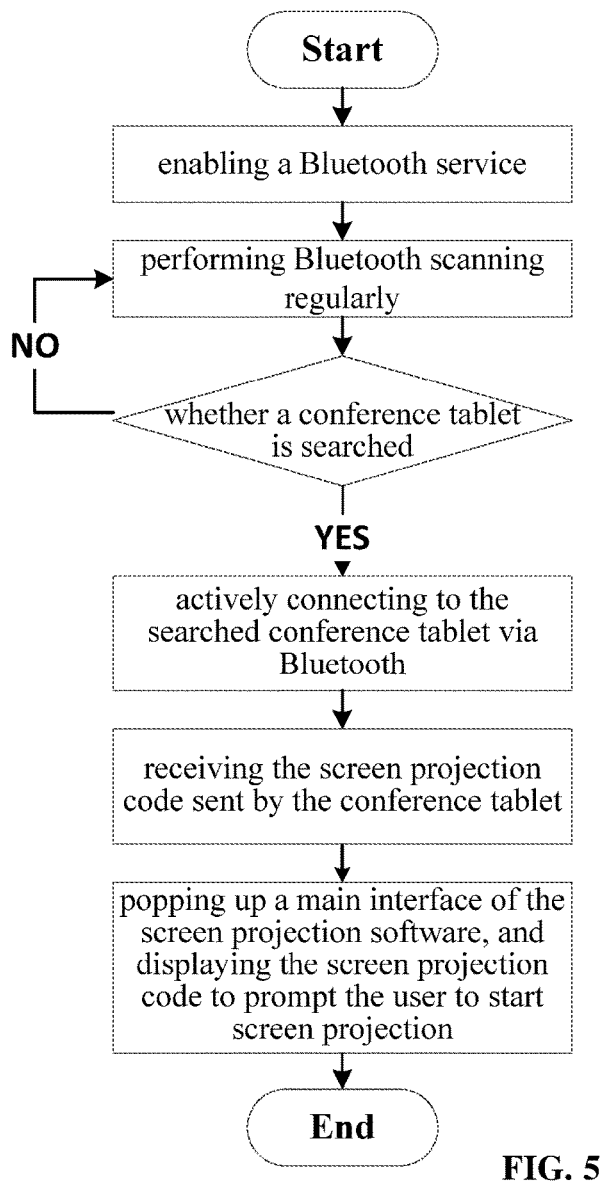
FIG. 5 is a flowchart of a screen projection method applied to a sending end device according to another embodiment of the present application.

As shown in FIG. 5, the screen projection method applied to the sending end device may include the following steps.

Step 1, enabling a Bluetooth service.

The sending end device is provided with a Bluetooth module. Before screen projection, the Bluetooth function of the Bluetooth module should be enabled first. Specifically, the screen projection software installed on the sending end device may automatically enable the Bluetooth function of the Bluetooth module and set it to a detectable state.

Step 2, performing Bluetooth scanning regularly.

After the Bluetooth is enabled, the sending end device actively and circularly performs Bluetooth scanning to search for a conference tablet.

Step 3, determining whether a conference tablet is searched, if yes, execute Step 4, otherwise, return to execute Step 2.

Step 4: actively connecting to the searched conference tablet via Bluetooth.

When the sending end device finds a conference tablet nearby, it will actively connect to the conference tablet via Bluetooth. The sending end device sends a connection request packet that carries identification information indicating whether the sending end device has opened the screen projection software to the conference tablet, and the conference tablet determines whether the sending end device has opened the screen projection software according to the identification information in the received connection request packet. If the identification information indicates that the sending end device has opened the screen projection software, the sending end device directly establishes Bluetooth connection with the conference tablet.

Step 5, receiving the screen projection code sent by the conference tablet.

After the sending end device establishes a Bluetooth connection with the conference tablet, the conference tablet will send the screen projection code to the sending end device.

Step 6, popping up a main interface of the screen projection software, and displaying the screen projection code to prompt the user to start screen projection.

After successfully receiving the screen projection code, the sending end device will actively pop up the main interface of the screen projection software and display the received screen projection code on the main interface. After the user sees the screen projection code on the main interface, the user may determine that the connection between the sending end device and the receiving end device has been established. At this time, the user may click and select on the interface to trigger the screen projection operation.

Figure 6:
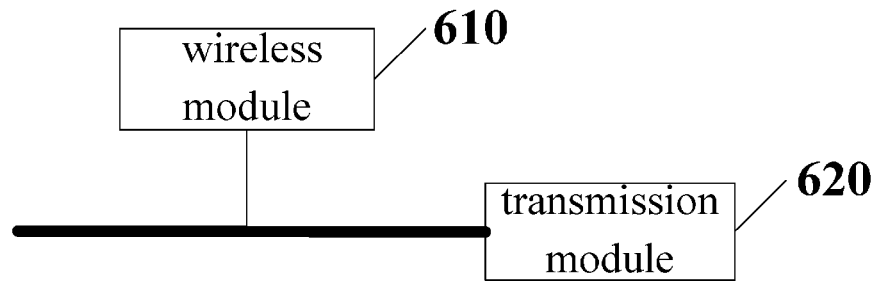
FIG. 6 is a schematic structural diagram of a receiving end device according to an embodiment of the present application.

Corresponding to the above method embodiment, an embodiment of the present application provides a receiving end device, as shown in FIG. 6, which includes a wireless module 610 and a transmission module 620, the wireless module 610 is configured for searching for a sending end device by using a preset wireless scanning technology, and establishing a wireless connection with the sending end device when the sending end device is found, the transmission module 620 is configured for acquiring a screen projection code, and sending the screen projection code to the connected sending end device, so that the connected sending end device displays the screen projection code to prompt a screen projection operation.

Optionally, the wireless module 610 is specifically configured for: enabling a Bluetooth service, and periodically searching for the sending end device by using a Bluetooth scanning technology.

Optionally, the wireless module 610 is specifically configured for: sending a request packet to the sending end device when the sending end device is found; receiving a response packet fed back by the sending end device, wherein the response packet carries identification information indicating whether the sending end device has opened a screen projection software; establishing the wireless connection with the sending end device when it is determined that the sending end device has opened the screen projection software based on the identification information.

Optionally, the receiving end device further includes:

a detection module, configured for detecting whether the current screen projection code changes;

the transmission module 620 is specifically configured for: when the current screen projection code changes, acquiring the changed current screen projection code.

Optionally, the wireless module 610 is specifically configured for: when the current screen projection code does not changed, searching for the sending end device by using the preset wireless scanning technology.

According to the embodiment of the present application, the receiving end device actively scans and searches for a sending end device, and when the sending end device is found, it establishes a wireless connection with the sending end device; and once the wireless connection is established, the receiving end device automatically sends a screen projection code to the connected sending end device, and the sending end device may prompt a user to perform a screen projection operation by means of displaying the screen projection code. In this process, there is no need for the user to perform complicated manual operations, the sending end device can automatically acquire the screen projection code and prompt the user to perform the screen projection operation in time, thus improving the timeliness of the screen projection operation.

Figure 7:
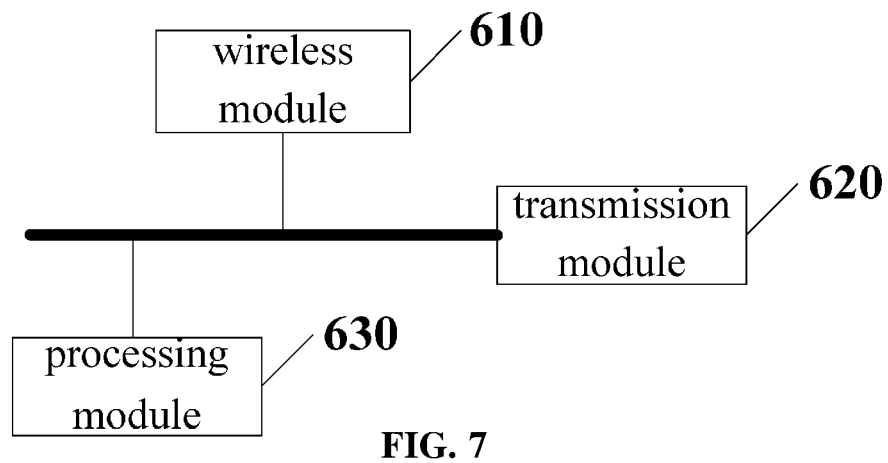
FIG. 7 is a schematic structural diagram of a receiving end device according to another embodiment of the present application.

Based on the embodiment shown in FIG. 6, an embodiment of the present application also provides a receiving end device, as shown in FIG. 7, which includes a wireless module 610, a transmission module 620 and a processing module 630, the wireless module 610 is configured for searching for a sending end device by using a preset wireless scanning technology, and establishing a wireless connection with the sending end device when the sending end device is found, the transmission module 620 is configured for acquiring a screen projection code, and sending the screen projection code to the connected sending end device, so that the connected sending end device displays the screen projection code to prompt a screen projection operation;

the processing module 630 is configured for performing the screen projection operation.

Figure 8:
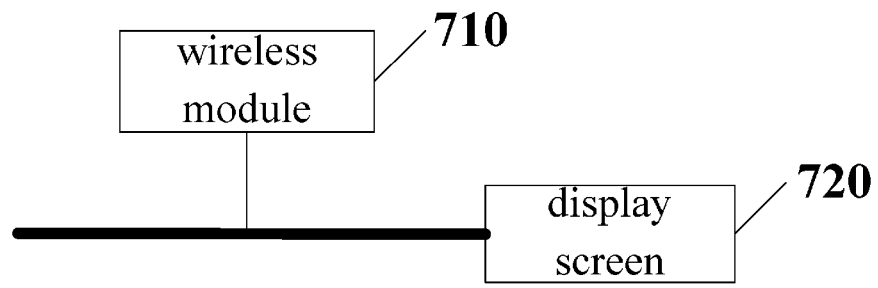
FIG. 8 is a schematic structural diagram of a sending end device according to an embodiment of the present application.

An embodiment of the present application also provides a sending end device, as shown in FIG. 8, which includes a wireless module 710 and a display screen 720, the wireless module 710 is configured for searching for a receiving end device by using a preset wireless scanning technology; and establishing a wireless connection with the receiving end device when the receiving end device is found;

the display screen 720 is configured for receiving and displaying a screen projection code sent by the receiving end device to prompt a screen projection operation.

Optionally, the wireless module 710 is specifically configured for: enabling a Bluetooth service, and performing periodically searching for the receiving end device by using a Bluetooth scanning technology.

Optionally, the sending end device has opened a screen projection software;

the display screen 720 is specifically configured for: receiving the screen projection code sent by the receiving end device; displaying a main interface of the screen projection software, and displaying the screen projection code on the main interface to prompt the screen projection operation.

According to the embodiment of the present application, the sending end device actively scans and searches for a receiving end device, and when the receiving end device is found, it establishes a wireless connection with the receiving end device; and after the wireless connection is established, the sending end device will receive the screen projection code sent by the receiving end device, display the received screen projection code, and prompt the user to perform the screen projection operation by displaying the screen projection code. In this process, there is no need for the user to perform complicated manual operations, the sending end device can automatically acquire the screen projection code and prompt the user to perform the screen projection operation in time, thus improving the timeliness of the screen projection operation.

The wireless module may be a Bluetooth module, a WiFi module, etc., which is not specifically limited in the embodiment of the present application.

As for the embodiments of the receiving end device and the sending end device, the content of the methods involved are basically similar to the above method embodiments, so the description is relatively simple. Please refer to the partial descriptions of the method embodiments for the relevant details.

It should be noted that the relationship terms use here, such as "first", "second" and the like are only to distinguish one entity or operation from another entity or operation, but do not necessarily require or imply that there is actual relationship or order between these entities or operations. Moreover, the terms "include", "comprise" or any variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements limited by the wording "comprise(s) a/an . . . " and "include(s) a/an . . . " do not exclude additional identical elements in the processes, methods, articles, or devices, including the listed elements.

The embodiments described above are only preferred embodiments of the present application, and are not intended to limit the scope of protection of the present application. Any modifications, equivalent replacement, improvement made within the spirit and principle of the present application shall be included in the scope of protection of the present application.

What is claimed is:

1. A screen projection method, which is applied to a receiving end device, comprising:
    searching for a sending end device by using a preset wireless scanning technology;
    establishing a wireless connection with the sending end device when the sending end device is found;
    acquiring a screen projection code, and sending the screen projection code to the connected sending end device, so that the connected sending end device displays the screen projection code to prompt a screen projection operation;
    wherein the establishing a wireless connection with the sending end device when the sending end device is found, comprises:
    sending a request packet to the sending end device when the sending end device is found;
    receiving a response packet fed back by the sending end device, wherein the response packet carries identification information indicating whether the sending end device has opened a screen projection software; and
    establishing the wireless connection with the sending end device when it is determined that the sending end device has opened the screen projection software based on the identification information.

2. The method according to claim 1, wherein the searching for a sending end device by using a preset wireless scanning technology, comprises:
    enabling a Bluetooth service, and periodically searching for the sending end device by using a Bluetooth scanning technology.

3. The method according to claim 1, wherein after establishing the wireless connection with the sending end device when the sending end device is found, the method further comprises:
    detecting whether the current screen projection code changes;
    wherein the acquiring a projection code comprises:
    when the current screen projection code changes, acquiring the changed current screen projection code.

4. The method according to claim 3, wherein after detecting whether the current projection code changes, the method further comprises:
    when the current screen projection code does not change, returning to the searching for a sending end device by using a preset wireless scanning technology.

5. A screen projection method, which is applied to a sending end device, comprising:
    searching for a receiving end device by using a preset wireless scanning technology;
    establishing a wireless connection with the receiving end device when the receiving end device is found; and
    receiving and displaying a screen projection code sent by the receiving end device to prompt a screen projection operation;
    wherein establishing a wireless connection with the receiving end device when the receiving end device is found, comprises:
    sending a connection request packet that carries identification information indicating whether the sending end device has opened a screen projection software to the receiving end device;
    establishing the wireless connection with the receiving end device if the identification information indicates that the sending end device has opened the screen projection software.

6. The method according to claim 5, wherein the searching for a receiving end device by using a preset wireless scanning technology, comprises:
    enabling a Bluetooth service, and periodically searching for the receiving end device by using a Bluetooth scanning technology.

7. The method according to claim 5, wherein the sending end device has opened a screen projection software;
    wherein the receiving and displaying a screen projection code sent by the receiving end device to prompt a screen projection operation, comprises:
    receiving the screen projection code sent by the receiving end device;
    displaying a main interface of the screen projection software, and displaying the screen projection code on the main interface to prompt the screen projection operation.

8. A receiving end device comprising a wireless module and a transmission module, wherein:
    the wireless module is configured for searching for a sending end device by using a preset wireless scanning technology, and establishing a wireless connection with the sending end device when the sending end device is found,
    the transmission module is configured for acquiring a screen projection code, and sending the screen projection code to the connected sending end device, so that the connected sending end device displays the screen projection code to prompt a screen projection operation;
    wherein the wireless module is further configured for:
    sending a request packet to the sending end device when the sending end device is found;
    receiving a response packet fed back by the sending end device, wherein the response packet carries identification information indicating whether the sending end device has opened a screen projection software;

establishing the wireless connection with the sending end device when it is determined that the sending end device has opened the screen projection software based on the identification information.

9. The receiving end device according to claim 8, wherein the wireless module is further configured for:
enabling a Bluetooth service, and periodically searching for the sending end device by using a Bluetooth scanning technology.

10. The receiving end device according to claim 8, wherein the receiving end device further comprises:
a detection module, configured for detecting whether the current screen projection code changes;
the transmission module is further configured for:
when the current screen projection code changes, acquiring the changed current screen projection code.

11. The receiving end device according to claim 10, wherein the wireless module is further configured for:
when the current screen projection code does not change, searching for the sending end device by using the preset wireless scanning technology.

* * * * *